Jan. 6, 1970            N. R. PARLATORE            3,487,839
                     CIGAR MOUTHPIECE ASSEMBLY
Filed Jan. 11, 1968                              7 Sheets-Sheet 1
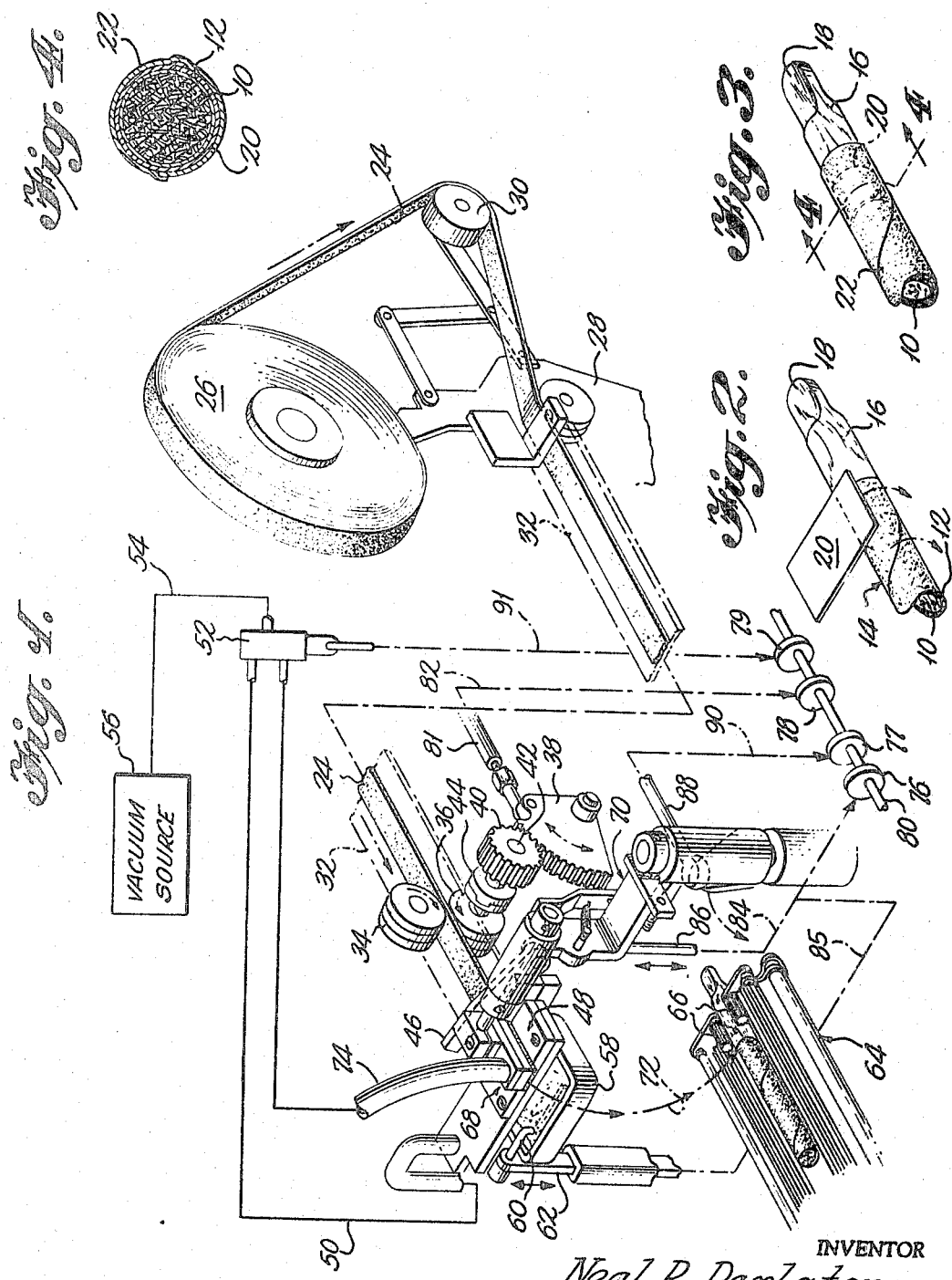
INVENTOR
Neal R. Parlatore
BY
Murray Schaffer
ATTORNEY

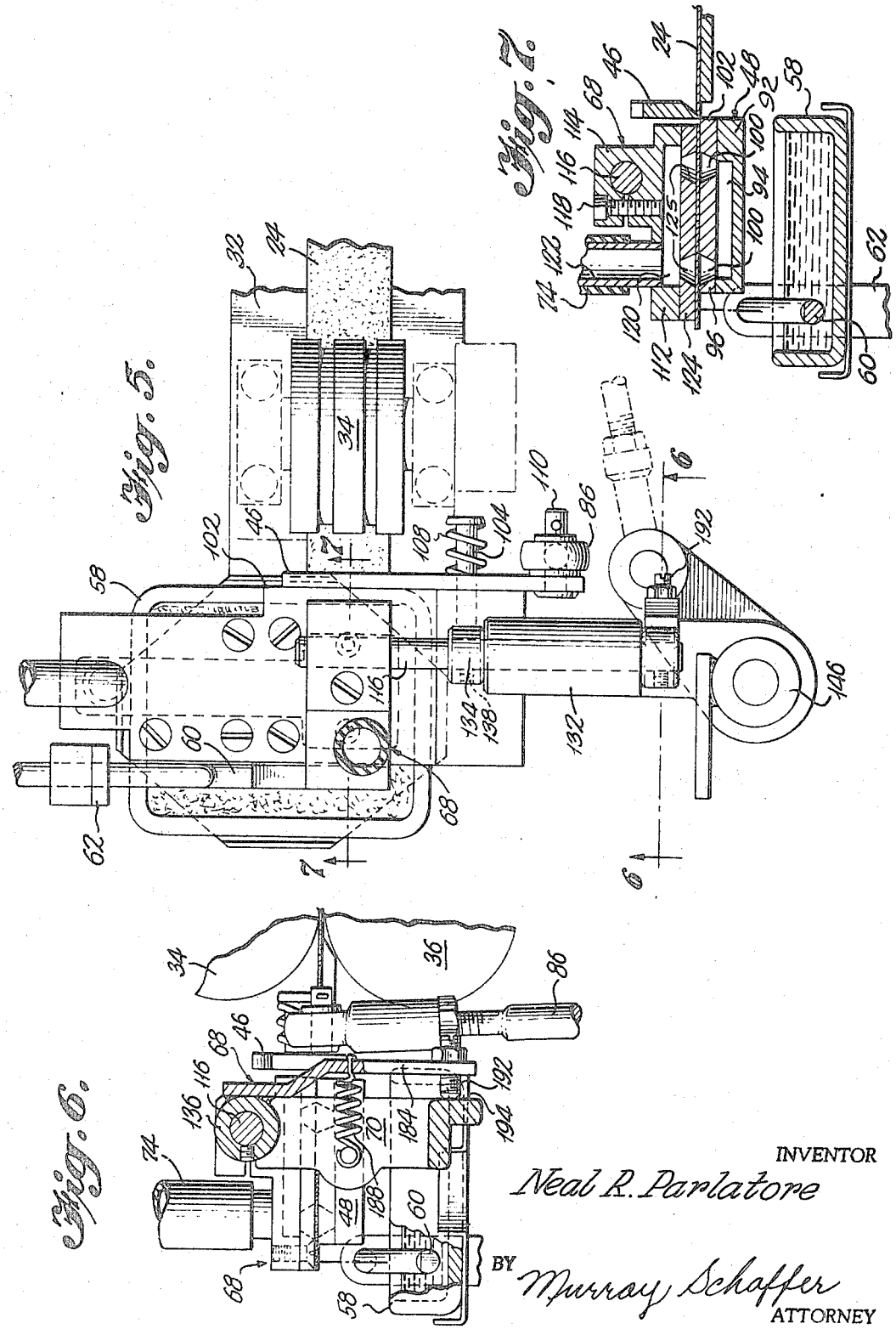

Jan. 6, 1970  N. R. PARLATORE  3,487,839
CIGAR MOUTHPIECE ASSEMBLY
Filed Jan. 11, 1968  7 Sheets-Sheet 7
Fig. 9.
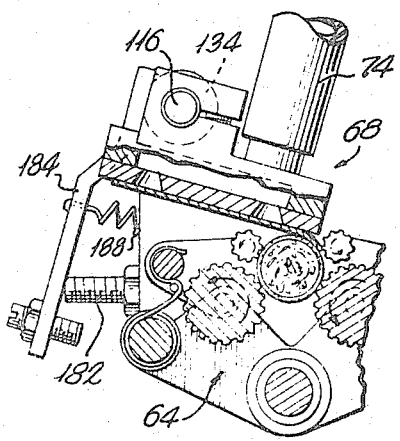
Fig. 8.
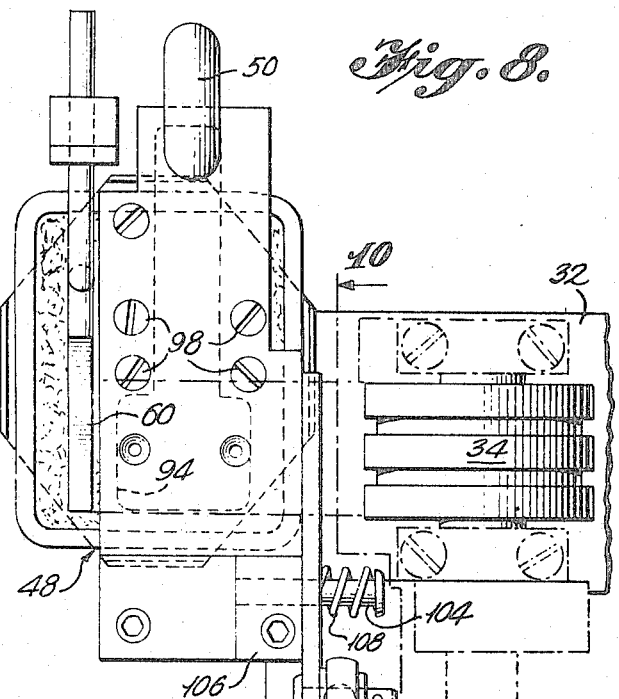
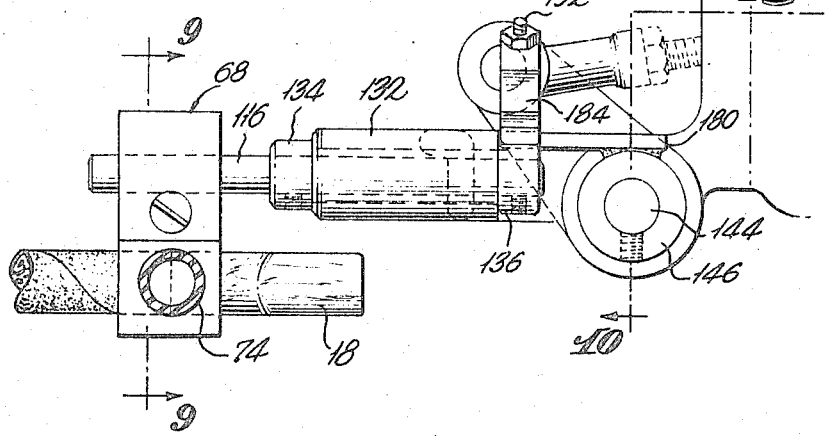
INVENTOR
Neal R. Parlatore
BY Murray Schaffer
ATTORNEY

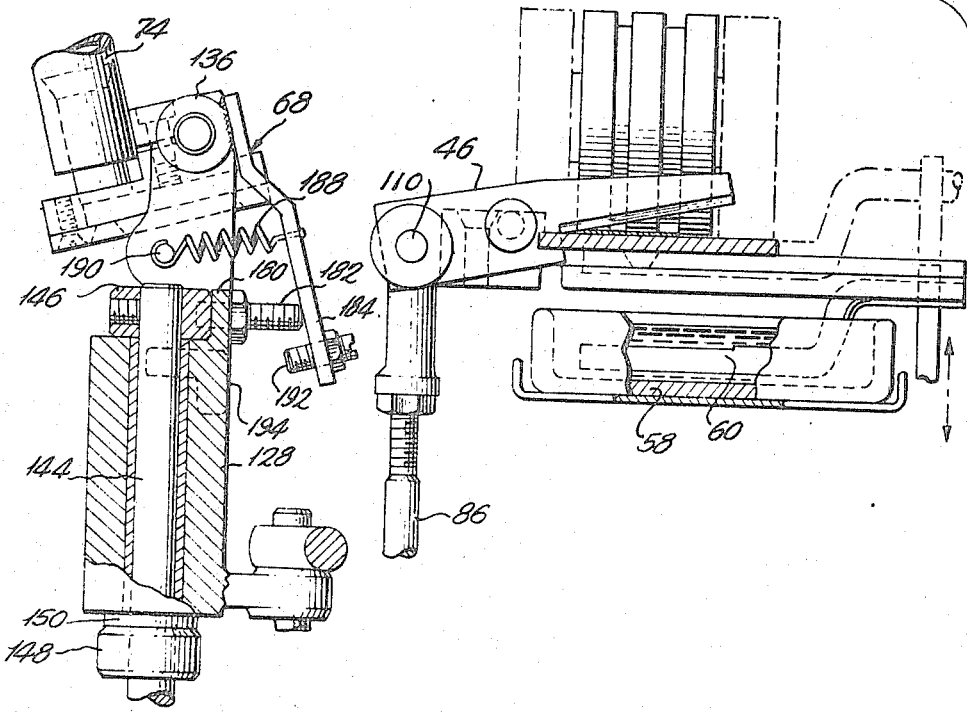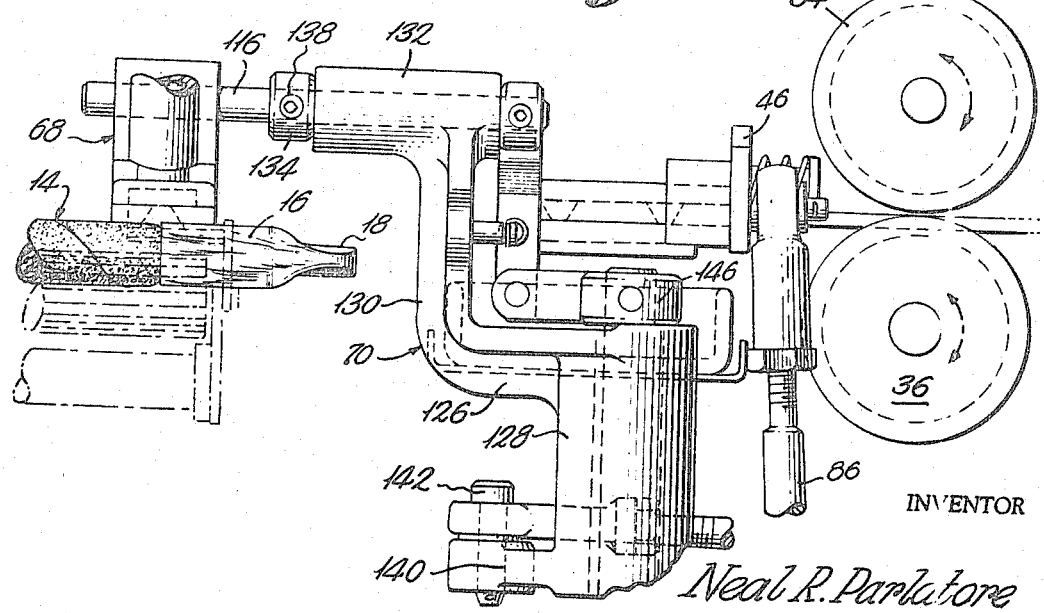

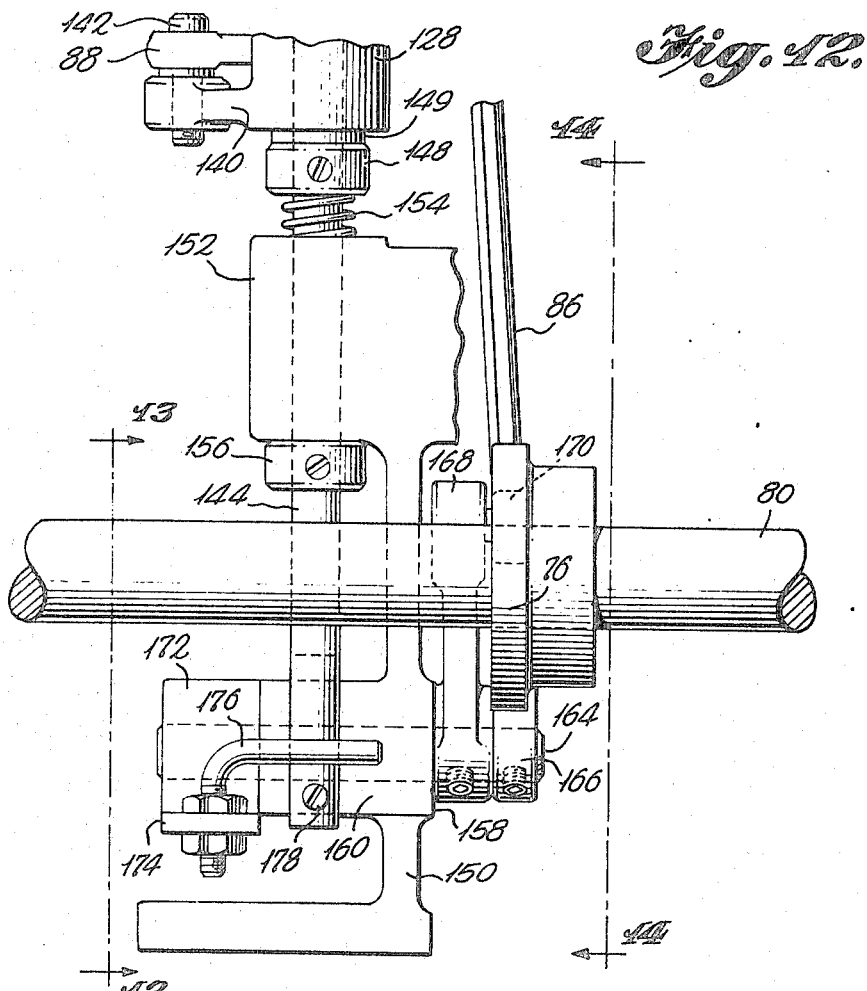
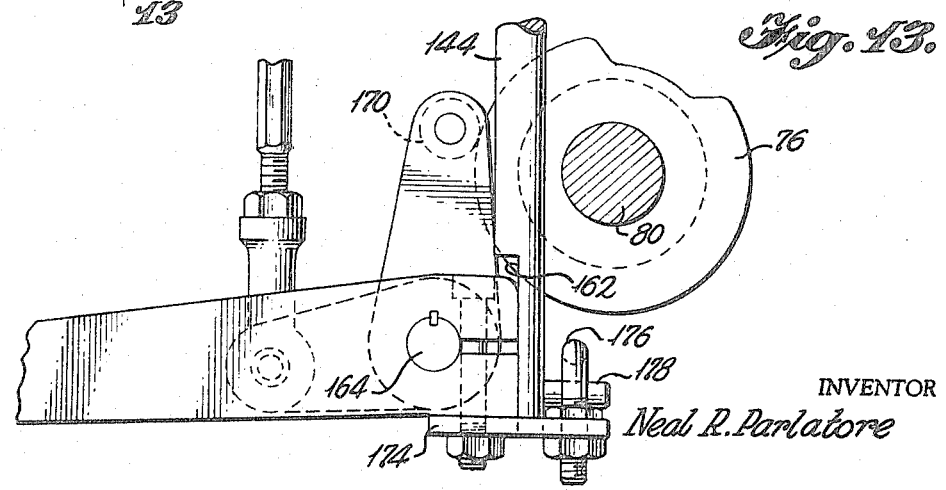

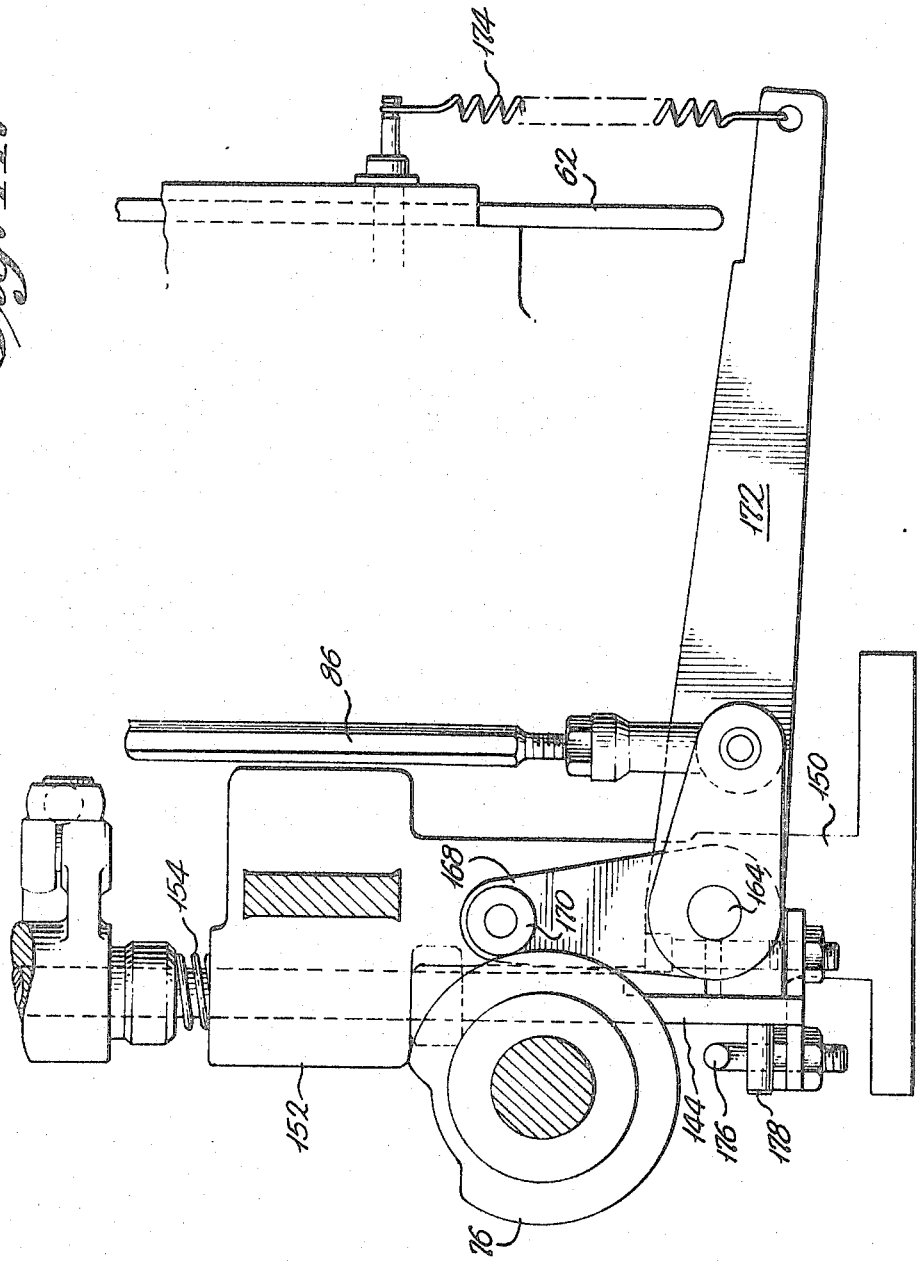

INVENTOR
Neal R. Parlatore

BY Murray Schaffer
ATTORNEY

United States Patent Office 3,487,839
Patented Jan. 6, 1970

3,487,839
CIGAR MOUTHPIECE ASSEMBLY
Neal R. Parlatore, Laurelton, N.Y., assignor to American Machine & Foundry Company, a corporation of New Jersey
Filed Jan. 11, 1968, Ser. No. 697,044
Int. Cl. A24c 1/32, 5/48, 5/58
U.S. Cl. 131—29
15 Claims

ABSTRACT OF THE DISCLOSURE

An apparatus for making an improved cigar mouthpiece assembly in which a reinforcing band of reconstituted tobacco is placed about the juncture of the mouthpiece and a cigar filler and binder prior to the application of a wrapper. The reinforcing band is formed from a continuous strip of reconstituted tobacco which is intermittently fed, cut, glued and transferred. The transfer means is supported on a carriage for movement between pick-up and delivery stations. The carriage includes means to pivot the transfer means upon its arrival at the delivery station, as to radially advance the glued leading edge of the strip to the assembly.

---

This invention relates to an improved cigar mouthpiece assembly, and more particularly, it concerns a unique method and apparatus for attaching a wooden or plastic mouthpiece to a cigar prior to the application of the wrapper, thereby to provide an improved cigar product.

In the manufacture of cigars using automatic machinery, a tobacco bunch filler is rolled or otherwise formed into a rod-like shape and a binder wrapped on the filler. The binder is, in many instances, a sheet of reconstituted tobacco and possesses sufficient tensile strength to retain the filler in a sufficiently compact condition to provide the desired smoking characteristics in the ultimate cigar. When it is desired to apply a wooden or plastic mouthpiece to the cigar, one end of the blank constituted by the filler and the binder is inserted into a recess in the mouthpiece to establish essentially a frictional connection of the mouthpiece to the blank. Thereafter, a tobacco leaf wrapper is applied over the blank and a portion of the mouthpiece. Suitable adhesives are employed so that the wrapper adheres to the portion of the mouthpiece to which it is applied. Hence, the attachment of the mouthpiece to the cigar is secured essentially by the outer wrapper, a natural tobacco leaf selected primarily for its aroma and/or appearance.

One of the problems encountered with the aforementioned technique is that the natural tobacco wrapper lacks sufficient tensile strength to effect a suitably strong connection of the mouthpiece to the cigar. This problem becomes aggravated as the wrapper loses moisture after the cigars are manufactured but before the retail sale thereof. As a result, special packaging techniques have been required to avoid separation of the mouthpiece from the cigar in handling. Also, problems are presented in retaining the initial connection of the mouthpiece and the blank during the application of the wrapper.

In acordance with the present invention, an improved assembly of a mouthpiece and a cigar is effected by wrapping a strip or band of reconstituted tobacco about the peripheral juncture of the mouthpiece and the cigar blank, constituted by the filler and binder, before the wrapper is applied. In this manner, the juncture of the mouthpiece and the cigar is reinforced by the band of reconstituted tobacco which has a tensile strength at least as great as that of the binder. Thereafter, the wrapper is applied over the binder and the strip so that the overall desirable appearance of the final cigar is maintained. The reinforcing strip is applied in a very effective manner while the pre-assembled blank and mouthpiece are in a wrapping device conventionally provided for the application of the wrapper. This operation is effected by advancing intermittently a continuous strip of reconstituted tobacco having a width equal to the width of the band to be applied about the juncture of the mouthpiece and the cigar blank, cutting the strip to a length sufficient to provide a band with an overlap, applying glue to one end of the strip on the surface thereof to engage the mouthpiece and the binder of the cigar blank, and then transferring the glued strip to the juncture of the cigar blank and mouthpiece in a manner such that the glued end of the strip is placed in direct contact with the binder and the mouthpiece. The wrapping device then rotates the cigar so that the strip is wrapped about the periphery of the blank and secured in place by a portion of the glue or adhesive bleeding through the end of the strip to which it was applied.

Among the objects of the present invention are therefore: the provision of an improved cigar mouthpiece assembly in which a reinforcing strip of reconstituted tobacco is glued about the juncture of the cigar blank and mouthpiece under the wrapper; the provision of an effective apparatus for cutting and applying a reinforcing band of reconstituted tobacco to a cigar of the type oforementioned; the provision of an apparatus of the type referred to which is adaptable to existing machinery used in the manufacture of cigars of the type referred to; and the provision of an improved method for attaching a mouthpiece to a cigar.

Other objects and further scope of applicability of the present invention will become apparent from the detailed description to follow taken in conjunction with the accompanying drawings in which:

FIG. 1 is a schematic perspective view illustrating the basic operating components of the apparatus of this invention in operation to apply a reinforcing band about the juncture of a cigar blank and a mouthpiece to be affixed thereto;

FIG. 2 is a fragmentary perspective view illustrating the application of the reinforcing band to a cigar blank and mouthpiece in accordance with this invention;

FIG. 3 is a fragmentary perspective view illustrating the reinforcing band after application to the cigar blank and mouthpiece at the juncture thereof;

FIG. 4 is a cross-section taken on line 4—4 of FIG. 3;

FIG. 5 is a fragmentary plan view of the strip forming apparatus of this invention during one position thereof;

FIG. 6 is a cross-section taken on line 6—6 of FIG. 5;

FIG. 7 is a cross-section taken on line 7—7 of FIG. 5;

FIG. 8 is a fragmentary plan view similar to FIG. 5 but showing the parts of the apparatus of this invention in a different operating position;

FIG. 9 is a fragmentary cross-section taken on line 9—9 of FIG. 8;

FIG. 10 is a fragmentary cross-section taken on line 10—10 of FIG. 8;

FIG. 11 is a fragmentary side elevation of the apparatus of this invention in the position shown in FIG. 8;

FIG. 12 is an enlarged fragmentary side elevation illustrating a drive and programming assembly of the apparatus of this invention;

FIG. 13 is a fragmentary cross-section taken on line 13—13 of FIG. 12;

FIG. 14 is a fragmentary cross-section taken on line 14—14 of FIG. 12;

FIG. 15 is a fragmentary end elevation illustrating the vacuum control mechanism of this invention;

Figure 45:
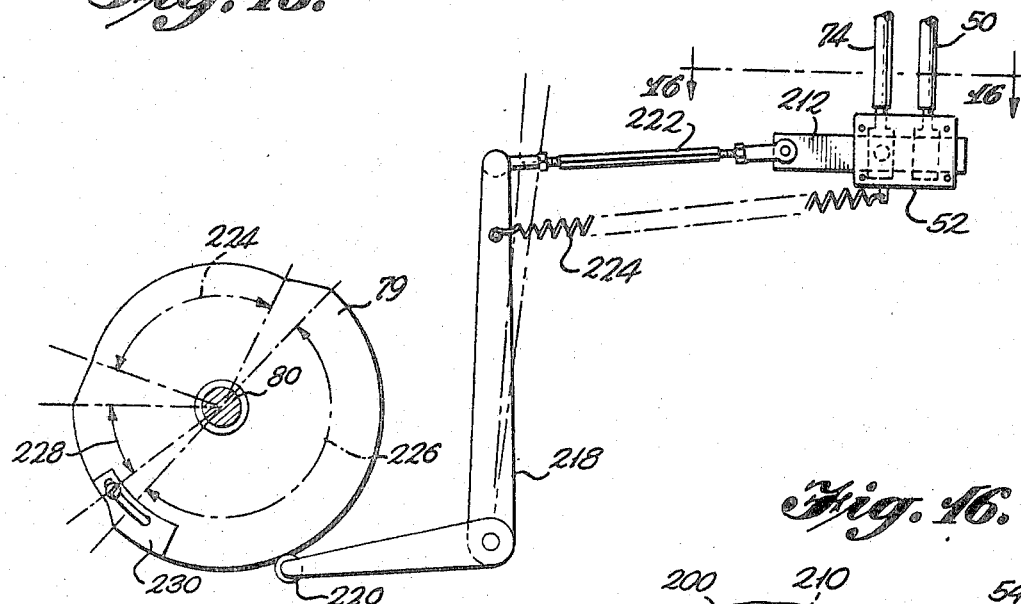

The cigar product of this invention is depicted in FIGS. 2–4 of the drawings at various stages of its formation. In accordance with conventional practice, the cigar product includes a filler 10 initially bound in a binder 12 preferably formed by a sheet of reconstituted tobacco of the general type disclosed in U.S. Patent 2,734,510—Hungerford et al. Such sheet material admirably suited for use as the binder because of its uniformity of texture, density and thickness as well as its tensile strength. Many other specific forms of such reconstituted tobacco sheet material than that disclosed in the aforesaid U.S. patent are presently available and may be used for the binder 12. Inasmuch as the filler 10 and the binder 12 constitute an incomplete product, the composite of these cigar portions will be referred to hereinafter as a cigar blank and designated in the drawings by the reference numeral 14.

In accordance with this invention, the cigar blank 14 is connected at one end to a mouthpiece 16 having a bit 18 at one end and formed of suitable material, such as wood or plastic. The mouthpiece 16 is conventional and as such, the end thereof opposite the bit 18 is formed with an axial recess to receive an end portion of the blank 14, thereby to facilitate an initial frictional assembly of the mouthpiece 16 and the blank 14. The complete connection of the blank 14 and the mouthpiece 16, in accordance with this invention, is effected by wrapping a band 20 about the periphery of the mouthpiece 16 and the blank 14 at the juncture thereof. The band 20 is retained about the blank and the mouthpiece by an adhesive in a manner which will be described in more detail below. It should be noted at this point, however, that the band 20 is formed of a reconstituted tobacco sheet similar to the sheet used for the binder 12 and thus possessing the desired tensile strength, among other desirable physical characteristics. After the band has been applied, a wrapper 22, which may be either of reconstituted tobacco or natural tobacco leaf, is applied in conventional fashion over the blank 14 and over a sufficient axial portion of the mouthpiece 16 to cover the reinforcing band 20. It will be appreciated that in the cigar product thus formed, not only is the mouthpiece 16 firmly attached to the cigar, but also all materials employed, apart from the mouthpiece itself, are tobacco products which in no way detract from the smoking characteristics of the cigar.

The general arrangement of components in the apparatus of this invention, as well as the basic method steps employed to form the cigar product illustrated in FIGS. 2–4, is shown schematically in FIG. 1 of the drawings. As shown, a continuous strip 24 of reconstituted tobacco is supplied from a reel 26 supported rotatably at one end of a frame 28. In accordance with conventional practice, the strip 24 is trained about a dancer roll 30, associated with appropriate break detector means (not shown) and along a table 32 to the nip of a pair of feed rolls 34 and 36. The feed rolls 34 and 36 are adapted to be rotated intermittently by a mechanism of the type disclosed in U.S. Patent No. 3,170,353—Wheeler et al. and which includes essentially an oscillating gear segment 38 in mesh with a pinion gear 40 connected to a drive shaft 42 in turn coupled to the lower roller 36 through a one-way clutch 44.

After leaving the rollers 34 and 36, the strip 24 is fed along the table 32 past a cutoff knife 46 to a receiving platform 48 operably connected by a conduit 50, a three-way valve 52, and a conduit 54 to a suitable vacuum source 56 to facilitate rettention of the strip on the receiving platform for reasons which will become apparent from the description to follow. A glue pot 58 is positioned below the receiving platform 48 and includes a dipper rod 60 carried by a vertically reciprocable slide 62 for applying a predetermined amount of glue carried by the pot 58 to the undersurface of the strip along the free end portion thereof. In light of the foregoing organization of components, it will be appreciated that a length of the strip 24, forming the band 20 described above with reference to FIGS. 2–4, may be severed and glued while in position on the receiving platform 48. At this point, it should also be noted that the preassembled cigar blank 14 and mouthpiece 16, to which the severed and glued band or strip portion must be applied, is positioned in a wrapping device 64 forming part of a cigar making apparatus with which the apparatus of this invention is associated. The wrapping device 64 is conventional and may be of the type disclosed, for example, in U.S. Patent No. 3,294,097—Gustavson. Such wrapping devices conventionally include a series of serrated rollers 66 which move into engagement with the periphery of the cigar or the cigar blank retained therein and are driven to effect rotation of the cigar blank about its axis.

To transfer the strip portion of band 20 from the platform 48, a vacuum transfer head, generally designated by the reference numeral 68, is employed. The transfer head 68 is carried by a pivoted carriage arm 70, in a manner to be described in more detail below, from an initial position over the strip portion situated on the platform 48, through an arc depicted by the arrows 72 in FIG. 1, to a delivery position over the cigar blank retained in the wrapping device 64. Also it will be noted that the head 68 is connected to the vacuum source 56 by way of a flexible conduit or hose 74, the three-way valve 52 and the line 54.

As will be explained in more detail below, each of the components described above is associated with a programming means by which the actuation of these components may be synchronized. In FIG. 1 of the drawings, one form of programming means is schematically depicted as including a series of cam templates 76, 77, 78 and 79 keyed to a driven, rotatable shaft 80 suitably carried by the frame 28 by appropriate bearing means (not shown). Also, the linkage by which the various operating components illustrated in FIG. 1 of the drawings connected to the respective cams 76–79 is in part depicted by dashed lines. Hence, it will be seen that the drive rollers 34 and 36 are operated by a pitman link 81 connected to the gear segment 38 and associated with the cam 78 by linkage represented by the dashed line 82. The cutoff knife 46 as well as the glue applicator 60 are associated with the cam template 76 by linkage means designated respectively in FIG. 1 by a dashed line 84 extending between the cam template 76 and a rod 86 connected pivotally to the knife and by a dashed line 85 extending to the slide 62 on which the glue applicator 60 is mounted. Movement of the transfer head arm 70 is effected by a link 88 and other linkage represented by the dashed line 90 associated with the cam 77. Similarly, the valve 52 is actuated by linkage represented by the dashed line 91 and associated with the cam template 79. Thus, it will be appreciated that proper synchronization of the operating components may be effected by the selection of cam template profiles and adjustment in the respective angular positions of the cam templates on the common shaft 80.

Referring now in more detail to the construction of the components generally described above with respect to FIG. 1 of the drawings, it will be noted in FIGS. 7 and 8 that the strip receiving platform 48 includes a lower plate-like member 92 milled or otherwise machined to provide a vacuum manifold chamber 94 and an upper plate 96 secured on the lower plate 92 by suitable means such as screws 98. A pair of inverted frusto-conical apertures 100 extend through the upper plate 96 and establish communication between the vacuum chamber 94 and the surface on the upper plate 96 which receives the strip 24. As shown in FIG. 8, for example, the vacuum pipe 50 communicates with the chamber 94 by attachment over an aperture (not shown) formed in the upper plate 96. The plates 92 and 96 are shaped to define a rearwardly facing fixed shearing edge 102 for cooperating with the cutoff knife 46. As shown in FIGS. 7, 8 and 10 of the drawings, the cutoff knife 46 is pivotally supported by a pin 104 anchored in a block 106 secured to the receiving platform 48. A spring 108 acting between the head of the pin 104 and the knife 106 resiliently biases the cutting edge of the cutoff knife 46 into shearing engagement with the surface defining the fixed edge 102. The link 86 is pivotally connected to a pivot pin 110 extending through the knife at its outer end. Thus, upward movement of the link 86 will pivot the knife 46 so that the cutting edge thereon moves downwardly through the strip 24 into shearing engagement with the edge 102.

As shown in FIGS. 5 and 7, for example, the transfer head 68 includes an upper body part 112 having a clamping boss portion 114 by which the head may be secured non-rotatably on a supporting shaft 116 by a clamping screw 118. The lower portion of the upper part 112 is cut out to establish a vacuum manifold chamber 120 in fluid communication with the flexible conduit 74 through a nipple 122. The head 68 also includes a lower plate 124 having frusto-conical apertures 125 therein to establish fluid communication between the lower surface on the plate 124 and the vacuum manifold chamber 120.

As illustrated in FIG. 1 of the drawings and in more detail in FIG. 11 of the drawings, the transfer head arm 70 is generally of an L-shaped configuration to establish a lower horizontal leg 126 projecting integrally from a vertical bearing tube 128 and an upstanding leg 130 carrying a horizontal bearing tube 132. The transfer head supporting shaft 116 is journaled for rotation in the bearing tube 132 and secured against axial movement with respect thereto by a pair of collars 134 and 136 which are fixed to the shaft 116 by suitable means such as set screws 138. The vertical bearing tube 128 carries an integrally projecting control arm 140 at its lower end to which the link 88 is pivotally connected by a pin 142. Also, it will be noted in FIG. 10 that the vertical bearing tube 128 is rotatably mounted near the upper end of a vertical shaft or post 144 and secured against axial movement thereon by an upper stop collar 146 and a lower stop collar 148. A thrust bearing 150 facilitates rotation of the vertical bearing tube 128 relative to the stop collar 148.

The vertical shaft 144, as shown in FIGS. 12 and 13, is carried by a standard 150 secured to the frame 28 and having a bored boss 152 through which the shaft 144 is passed slidably to facilitate a measure of axial movement of the shaft 144 relative to the boss 152. A spring 154 disposed between the upper surface of the boss 152 and the stop collar 148 operates to bias the shaft upwardly so that a further stop collar 156 engages the lower surface of the boss 152. The standard 150 is formed having a bearing boss 158 near its lower end formed with a flat surface 160. As shown in FIG. 13, the lower end of the vertical shaft 144 is provided with corresponding flat 162 which slidably engages the flat surface 160 on the bearing boss 158, thereby to prevent rotation of the vertical shaft 144 on its axis.

The vertical movement of the shaft 144 and thus of the arm 70 and the transfer head 68 carried thereon facilitates the placement of the transfer head 68 in its pickup position as shown, for example, in FIGS. 5–7 of the drawings wherein it is positioned over the portion of the strip 24 fed onto the receiving platform 48. Specifically, when the stop collar 156 engages the lower surface on the boss 152, the lower surface of the transfer head is positioned approximately ⅟₁₆ of an inch above the strip on the receiving platform 48. In order to effect a clamping action of the strip portion between the transfer head and the platform, the transfer head is moved against the strip under a clamping pressure simultaneously with operation of the cutting knife 46 and the glue applicator 60. The mechanism by which this co-action of the cutoff knife 46, the transfer head 69 and the glue applicator 60 is effected is illustrated in FIGS. 12–14. The bearing boss 158 receives rotatably a shaft 164 which in turn carries non-rotatably on one end, a crank arm 166 pivotally connected to the lower end of the cutoff knife actuating link 86 and a cam follower crank 168 carrying a follower roll 170 which engages the peripheral surface of the cam template 76. Non-rotatably secured on the other end of the shaft 164 is a relatively long arm 172 which extends to a position below the lower end of the glue applicator slide 62. A tension spring 174 biases the arm 172 and thus the shaft 164 into a position so that the cam follower roll 170 is retained against the cam template 76. It will be appreciated therefore, that when the cam follower 170 registered with a recess in the cam template 76, counterclockwise rotation of the shaft 164 as well as the crank arms 166 and 172 will occur. This movement results in an upward movement of the link 86 to operate the cutoff knife 46 as above mentioned. Similarly, the arm 172 will engage the lower end of the glue applicator rod slide 62 to move the glue applicator 60 up into engagement with the under surface of the free end of the strip fed to the position shown in FIG. 7, for example.

As shown in FIGS. 12 and 13, a plate 174 is carried on the lower surface of the arm 172 and in turn supports on the end thereof opposite the arm 172 an inverted L-shaped rod 176 preferably formed of spring steel to provide a measure of inherent resiliency. Also it will be noted that the horizontal leg of the L-shaped rod 176 overlies a stud 178 projecting rearwardly at the lower end of the vertical shaft 144. Thus, concurrently with actuation of the glue applicator 60 and the knife 46, the shaft 144, and thus the head 68, is drawn downwardly against the bias of the spring 154 so that the end of the strip 24 is firmly clamped between the lower surface of the transfer head 68 and the receiving platform 48, the inherent resiliency of the inverted L-shaped rod preventing the application of an over-pressure. This clamping action is important from the standpoint of retaining a reference position for the severed and glued strip portion which at this point becomes the band 20.

In accordance with another important feature of the present invention, the transfer head 68, in moving to its delivery position as shown in FIGS. 8–10 of the drawings, is tilted or pivoted at the end of its movement so that the leading end portion of the strip or band 20 retained by the head, and to which glue has been applied, is moved radially against the periphery of the cigar blank 14 and mouthpiece 16 preassembled in the wrapping device 64. To effect the tilting of the transfer head 60 in this manner, the upper collar 146, fixed to the non-rotatable post or vertical shaft 144, carries a tangent plate 180 secured such as by welding to the periphery of the collar 146. The tangent plate 180 in turn carries at its free end an adjustable set screw 182 as shown in FIGS. 10 and 11. In similar fashion, a bent tab 184 is secured by welding or other suitable means tangentially to the collar 136 on the head supporting rotatable shaft 116. As shown in FIGS. 10 and 11, the bent tab 184 is positioned to be engaged by the set screw 182 so that as the transfer head 68 is carried by the arm 70 toward its delivery position, the set screw 182 engages the bent tab 184 to rotate the shaft 116 and thus the head 68 into the inclined position shown in FIGS. 9 and 10 of the drawings. A tension spring 188 connected between the bent tab 184 and a post 190 secured on the upstanding leg 130, biases the tab 184 and thus the shaft to its initial position. To provide a measure of adjustability in the initial or normal angular position of the head 68, the bent tab 184 carries a second set screw 192 positioned to engage a flat 194 on the lower horizontal leg 126 of the arm 70.

Figure 16:
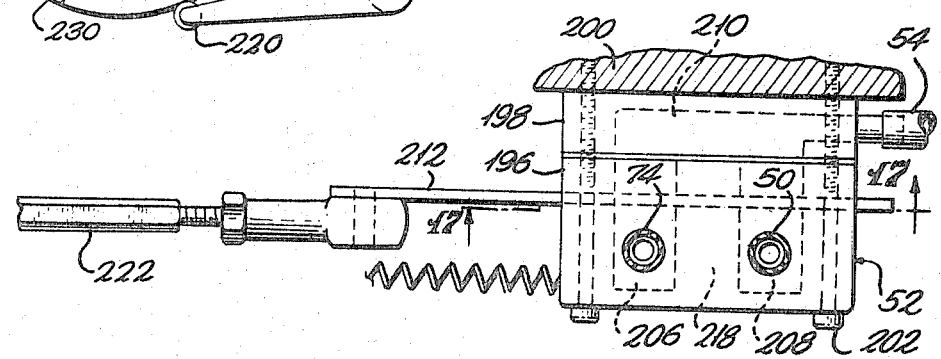
FIG. 16 is an enlarged fragmentary plan view as seen from line 16—16 of FIG. 15.
Figure 17:
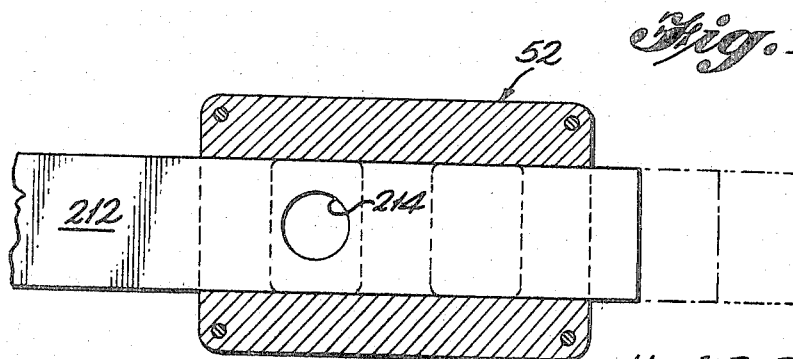
FIG. 17 is an enlarged cross-section taken on line 17—17 of FIG. 16.

As described above, the receiving platform 48 and the transfer head 68 are connected respectively by conduits 50 and 74, the three-way valve 52 and the line 54 to a suitable vacuum source 56. The structure of the valve 52, as well as the means by which it is operated through a cycle during which the band 20 is formed and applied to the cigar blank, is illustrated in FIGS. 15–17 of the drawings. In the embodiment shown, the valve includes first and second body parts 196 and 198 secured to each other and to a supporting boss 200 on the frame 28 by screw bolts 202. The first body part 196 is formed having a pair of chambers 206 and 208 in fluid communication respectively with the line 74 extending to the transfer head 68 and the line 50 exetnding to the receiving platform 48. The second part 198 includes a manifold chamber 210, in turn connected to the line 54 extending to the vacuum source 56. A valve slide 212 having an aperture 214 therein extends through a transverse slide way in the first body part 96 and is, therefore, located between the connection of the lines 50 and 74 to the chambers 206 and 208 in the first body part and the manifold chamber 210. The chambers 206 and 208 are separated by a bridge 218 of a width greater than the diameter of the slide aperture 214 so that the aperture may be positioned over either one of the chambers 206 and 208, or over the bridge 214 and thus isolate both chambers, cutting off both lines 50 and 74 from the manifold chamber 210 and the vacuum source 56.

As above indicated, the slide 192 is operably associated with the cam 79 by appropriate means including a bell crank 218 having a cam follower 220 on one arm thereof and being connected at the end of its other arm to the slide 212 by a link 222. A tension spring 224 biases the follower 220 into engagement with the periphery of the cam 79. As shown in FIG. 12, the cam 79 is shaped with three camming surfaces of different radii and depicted respectively by arcs 224, 226 and 228. The radius of the cam over the respect arcs 224, 226 and 228 is selected so that when the follower 220 engages the cam on the arc 224, the slide aperture 214 provides communication between the manifold chamber 210 and the chamber 208 in the valve 52, thus connecting the source of vacuum 56 to the manifold chamber 94 in the receiving platform 48. When the follower 220 is in engagement with the periphery of the cam 79 on the arc 226, the slide aperture 214 takes the position shown in FIGS. 12-14, thereby to connect the vacuum source operably to the manifold chamber 210 in the transfer head 68. When the cam follower engages the cam on the arc 228, the slide aperture 214 will be positioned over the bridge 218, thereby cutting off both the receiving platform 48 and the transfer head 68 from the vacuum source 56.

In operation, the band 20 is formed and applied to a cigar once during each complete revolution of the shaft 80 on which the programming cam templates 76-79 are keyed. Assuming the start of the cycle to involve actuation of the feed rolls 34 and 36 to feed the strip 24 so at the free end thereof is positioned on the receiving platform 48 in the position shown, for example in FIG. 7 of the drawings, the cam follower 220 (FIG. 15) will be positioned on the arc 228 of the cam template 79, thereby closing off the connection of the vacuum source 56 to the receiving platform 48 during the feeding movement. Concurrently with this operation, the transfer head 68 will be positioned at or returning from the delivery station over the wrapping device 64 by the link 88 and linkage 90 under the control of the cam template 77. After feeding movement of the rolls 34 and 36 has terminated, the cam 79 will have rotated so that the cam follower 220 is positioned on the arc 224 and thus connecting the vacuum source with the receiving platform 48 and the apertures 100 therein to draw the strip against the platform. The transfer head 68, being elevated slightly above the level of the strip by the compression spring 154 and the shaft 144 sufficiently to clear the strip portion, now swings into its pickup position over the platform 48. As the cam 79 reaches a position so that the cam follower 220 is nearing the end of its travel on the arc 224, the cam template 76 is rotated to a position where the cam follower 170 (FIG. 14) moves counter clockwise and hence substantially simultaneously lowers the head 68 into clamping engagement with the strip, actuates the cutting knife 46 to sever the band 20 from the strip 24 and elevates the glue applicating rod 60 to apply glue to the underside of the projecting end portion of the band (FIG. 7) completely across its width. During this time, the cam 79 has rotated to a position such that the cam follower 220 engages the arc 226 and thus effect a transfer of the vacuum from the receiving platform 48 to the transfer head 68 by operation of the three-way valve 52 as described above. Hence, by the time the cam 76 returns the follower 170 in a clockwise direction to release the shaft 144 so that the spring 154 lifts the head 68 to its initial position, the connection of the vacuum source to the head will cause the severed strip, now the band 20, to lift with the head.

The transfer head 68 is then moved through the arcuate path designated by the arrows 72 in FIG. 1 to its delivery position relative to the wrapping device 64 having mounted therein a preassembled cigar blank 14 and mouthpiece 16. As the head 68 reaches the delivery position and as described above, it is tilted due to engagement of the bent tab 184 with the set screw 182 to place the glued end of the band 20 against the periphery of the cigar blank 14 and mouthpiece 16. The serrated rollers 66 in the wrapping device at this point clamp down against the cigar in such a way that the band is fed between the nip of the serrated rollers and the cigar blank and the latter is rotated. At this point in the cycle, the follower 220 is transferred between the arc 226 and the arc 228 on the cam 79 to disconnect the vacuum source 56 from the head 68 and release the band 20. The cam 79 is provided with an adjustment plate 230 by which this action may be acturately adjusted. In some instances it is found desirable to retain the vacuum in the head during initial wrapping of the band to impose a slight drag thereon to insure smooth application.

After the band 20 is wrapped about the cigar blank and mouthpiece 14 and 16 respectively, the blank is transferred to a further wrapping device for the application of the outer wrapper 22. As shown in FIG. 3 of the drawings, the outer wrapper extends over the band 20 to conceal it from view thus to present the appearance of a conventional cigar and mouthpiece.

Thus it will be appreciated that by this invention, there is provided an extremely effective apparatus and method for securing a mouthpiece to a cigar and by which the above mentioned objectives are completely fulfilled. Moreover, the cigar product formed in this manner is not only superior from the standpoint of having a reinformed and thus relatively strong interconnection of the mouthpiece 16 to the cigar, but also from the standpoint of being formed completely of tobacco products.

It will be appreciated by those skilled in the tobacco machinery art that various modifications in the invention as described and illustrated herein can be made without material departure from the present invention. It is expressly intended, therefore, that the foregoing description is illustrative of a preferred embodiment only, not limiting the true spirit and scope of this invention.

I claim:

1. Apparatus for cutting and transferring a reinforcing band to a cigar and mouthpiece assembly, said apparatus comprising: a stationary receiving platform, means to feed a continuous strip of reinforcing material to said platform in increments corresponding to the length of the band, cutting means to sever the band from said strip, a band transfer head, and carriage means supporting said head for movement between a pickup station over said platform and a delivery station adjacent the cigar and mouthpiece assembly, said carriage means including means to pivot said head upon reaching said delivery station whereby the leading edge of said band is advanced to the cigar and mouthpiece assembly in a radial direction.

2. The apparatus recited in claim 1 including means to apply glue across the leading edge of the band and on the surface thereof advanced against the cigar and mouthpiece assembly.

3. The apparatus recited in claim 2 wherein the leading edge of the band is positioned by said feeding means beyond the edge of said platform and wherein said glue applicating means includes a glue pot positioned below said platform and a glue applicator movable from within said glue pot upwardly into engagement with the leading edge of the band.

4. The apparatus recited in claim 1 including a vacuum source and means to connect said vacuum source with said transfer head whereby said band is held by suction against said transfer head.

5. The apparatus recited in claim 4 including means to connect said vacuum source with said platform to hold said strip against said platform by suction, and valve means for transferring the connection of said vacuum source from said platform to said transfer head.

6. The apparatus recited in claim 5 including means to advance said head toward said platform at said pickup station whereby the band may be clamped between said transfer head and said platform, and means to actuate said valve means to transfer the connection of said vacuum source from said platform to said transfer head while said head is clamped on the band and platform.

7. The apparatus recited in claim 1 wherein said platform includes a fixed shearing edge and wherein said cutting means includes a knife edge cooperable with said fixed cutting edge to sever the band from said strip.

8. The apparatus recited in claim 7 wherein said head is movable toward said platform at said pickup station to clamp the band between said head and said platform, means to move said head toward said platform, and means to synchronize actuation of said cutting means and movement of said head toward said platform whereby the band is clamped during actuation of said cutter.

9. Apparatus for cutting and applying a reinforcing band to a cigar blank and mouthpiece assembly in a wrapping device, said apparatus comprising: a stationary receiving platform positioned on an arc tangent to the juncture of the cigar blank and mouthpiece of the assembly in the wrapping device, feed means to advance a continuous strip of reinforcing material to said receiving platform in a direction tangential to said arc and in increments so that the leading edge of each successive band overhangs said platform, cutting means to sever the band from said strip, glue applicator means for applying an adhesive to the under surface of the overhanging leading edge of the band, a transfer head having a band engaging surface, means defining a vacuum source, means including a valve for connecting said vacuum source either to said platform or to said head through said band engaging surface, a carriage arm to support said head for movement between a pickup station over said platform and a delivery station over the wrapping device, said carriage arm being pivotally mounted on an axis at the center of curvature of said arc and said axis being normal to the plane thereof, means on said carriage arm to pivot said head on a radius of said arc upon reaching said delivery station, whereby the leading edge of the band to which adhesive has been applied is advanced to the cigar blank and mouthpiece assembly in a generally radial direction.

10. The apparatus recited in claim 9 wherein said means to pivot said head includes a head supporting shaft journaled for rotation in said carriage arm about a radial axis intersecting the pivotal axis of said carriage arm, projecting tab means secured on said radial shaft and extending transversely to the axis of said radial shaft, and fixed stop means to be engaged by said projecting tab means when said carriage is pivoted to move said head to said delivery station.

11. The apparatus recited in claim 10 including another stop means mounted on said carriage, and spring means normally urging said tab means against said second stop.

12. The apparatus recited in claim 11 wherein both said stop means are adjustable.

13. The apparatus recited in claim 10 wherein said carriage is movable axially along its pivotal axis and including yieldable means normally holding said carriage in a first axial position to locate the band engaging surface on said head in a plane spaced from the plane of said receiving platform by a distance greater than the thickness of said strip, and means operable when said head is at said pickup station to move said carriage and thus said head into clamping engagement with the strip on said platform.

14. The apparatus recited in claim 13, said last-mentioned means including a rotatable cam template, a cam follower in engagement with said cam template, linkage means connecting said cam follower operatively with said glue applicator means, said cutoff knife and said means to move said carriage and head into clamping engagement, where rotation of said cam template operates to clamp the band during actuation of said cutoff knife and said glue applicator.

15. The apparatus recited in claim 13 including means to actuate said valve to connect said vacuum source to said receiving platform after said strip has been advanced thereto, and to transfer the connection of said vacuum source from said platform to said transfer head while said head is in clamping engagement with the strip.

References Cited

UNITED STATES PATENTS

| 1,277,574 | 9/1918 | Hansen | 131—29 |
| 2,821,199 | 1/1958 | Korber | 131—94 |
| 2,864,379 | 12/1958 | Korber | 131—94 |
| 3,242,926 | 3/1966 | Clausen | 131—29 X |
| 3,306,306 | 2/1967 | Rudszinat | 131—94 |
| 3,308,833 | 3/1967 | Dearsley | 131—94 |

FOREIGN PATENTS

| 54,260 | 2/1967 | Germany. |
| 805,693 | 12/1958 | Great Britain. |

SAMUEL KOREN, Primary Examiner

J. H. CZERWONKY, Assistant Examiner

U.S. Cl. X.R.

131—20, 34, 94, 95